US 8,112,362 B2

(12) United States Patent
Abei

(10) Patent No.: US 8,112,362 B2
(45) Date of Patent: *Feb. 7, 2012

(54) STORAGE SYSTEM AND LICENSE MANAGEMENT METHOD

(75) Inventor: Hiroshi Abei, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1363 days.

This patent is subject to a terminal disclaimer.

(21) Appl. No.: 11/312,413

(22) Filed: Dec. 21, 2005

(65) Prior Publication Data

US 2007/0078984 A1    Apr. 5, 2007

(30) Foreign Application Priority Data

Oct. 4, 2005  (JP) .................................. 2005-290746

(51) Int. Cl.
*G06F 21/00* (2006.01)
(52) U.S. Cl. ......................................... 705/59; 711/114
(58) Field of Classification Search .................... 705/59; 711/114
See application file for complete search history.

(56) References Cited

U.S. PATENT DOCUMENTS

| 6,662,284 | B2 * | 12/2003 | Gold ............................. 711/163 |
| 7,237,078 | B2 * | 6/2007 | Hiraiwa et al. ................ 711/162 |
| 2002/0107956 | A1 | 8/2002 | Nakagawa et al. |
| 2004/0030822 | A1 * | 2/2004 | Rajan et al. ........................ 711/4 |
| 2004/0123029 | A1 * | 6/2004 | Dalal et al. ..................... 711/114 |
| 2004/0123063 | A1 * | 6/2004 | Dalal et al. ..................... 711/170 |
| 2004/0148380 | A1 * | 7/2004 | Meyer et al. .................. 709/223 |
| 2004/0153416 | A1 * | 8/2004 | Fujimoto .......................... 705/59 |
| 2005/0060506 | A1 | 3/2005 | Higaki et al. |
| 2006/0287961 | A1 * | 12/2006 | Mori et al. ....................... 705/59 |

FOREIGN PATENT DOCUMENTS

JP    2004-295846    10/2004

OTHER PUBLICATIONS

"Erasable System From MicroNet", Optical Information Systems Update, v 9, n 2, all pages, Feb. 1990.*
"Sistina Releases Linux Logical Volume Manager Production Version 1.0", Business Wire, all pagess, Aug. 27, 2001.*

* cited by examiner

*Primary Examiner* — Andrew J. Fischer
*Assistant Examiner* — Calvin Cheung
(74) *Attorney, Agent, or Firm* — Brundidge & Stanger, P.C.

(57) ABSTRACT

A storage system and a license management method that can simplify license management are proposed. In a storage system in which a first storage apparatus is connected to one or a plurality of second storage apparatuses and the first storage apparatus virtualizes each of the second storage apparatuses, the first storage apparatus checks, based on this license key, which targets the license key input from the outside for setting a predetermined optional function has been issued for, and transmits the license key to the corresponding second storage apparatus when the target to which the license key has been issued is the second storage apparatus, and the second storage apparatus sets the corresponding optional function in its own storage apparatus based on the license key transmitted from the first storage apparatus.

12 Claims, 13 Drawing Sheets

| OPTIONAL FUNCTION TYPE | LICENSED CAPACITY | TARGET STORAGE |
|---|---|---|
| OPTIONAL FUNCTION A | 3TB | SN.1000002 |
| OPTIONAL FUNCTION B | 3TB | SN.1000002 |
| OPTIONAL FUNCTION E | 1TB | SN.1000003 |
| OPTIONAL FUNCTION G | 3TB | SN.1000002 |

| # | SUPPORT | INSTALLATION | CAPACITY (TB) |
|---|---------|--------------|---------------|
| 0 | 1 | 1 | 12 |
| 1 | 1 | 0 | 0 |
| 2 | 1 | 1 | 15 |
| 3 | 0 | 0 | 0 |
| . | . | . | . |
| . | . | . | . |
| . | . | . | . |
| . | . | . | . |
| n | 0 | 0 | 0 |

41  42  43

40

STORAGE SYSTEM AND LICENSE MANAGEMENT METHOD

CROSS-REFERENCE TO RELATED APPLICATIONS

This application relates to and claims priority from Japanese Patent Application No. 2005-290746, filed on Oct. 4, 2005, the entire disclosure of which is incorporated herein by reference.

BACKGROUND OF THE INVENTION

The present invention relates to a storage system and a license management method, more particularly to those preferably applied to a virtualization system.

In recent years, a so-called disk array apparatus in which a plurality of hard disk drives is managed and operated using a RAID (Redundant Array of Inexpensive Disks) system has been widely used as a storage apparatus for storing data in corporations and government offices.

In this kind of storage apparatus, various optional functions such as 'remote copy' are pre-installed. A user can make the storage apparatus execute those optional functions by paying consideration for each of them to receive permission to use them (hereinafter referred to as "license") from the manufacture and installing a license key, with the license, for releasing a lock on the optional function that is issued.

It should be noted that JP-A-2004-295846 discloses a license management method as a technique of license management in a storage apparatus in which, when a client who has received a license uses a restricted component, the client always requires the license management server to give authorization, and the license management server judges whether or not to give the authorization based on restriction information such as user management information, client management information, and the number of registerable clients for each component, and the client can use and execute the component only after it receives the authorization.

SUMMARY OF THE INVENTION

Meanwhile, a virtualization system in which a storage apparatus is connected to another storage apparatus (hereinafter referred to as "master storage apparatus") and is used as a virtual device has been proposed and come into practical use recently. In this virtualization system, both a storage area provided by the master storage apparatus itself and that provided by any storage apparatus (hereinafter referred to as "slave storage apparatus") connected to the master storage apparatus and used as a virtual device are collectively managed by the master storage apparatus. Data input/output requests from the host device are allotted by the master storage apparatus to corresponding slave storage apparatuses, and thus the data read and write can be performed.

In this case, in a conventional virtualization system, settings for an optional function the license has been given for have to be configured separately in each storage apparatus in accordance with this license. Therefore, license management for the optional functions including the settings thereof in the entire virtualization system is complicated.

Moreover, if the license management is performed separately in each storage apparatus as described above, a user is economically burdened because, even When the slave storage apparatus has a license for an optional function that is originally necessary for the master storage apparatus, the user has to separately purchase the license for the same optional function for the master storage apparatus so that the master storage apparatus executes the optional function.

The present invention was made in consideration of the above problem, and it is an object of the invention to propose a storage system and a license management method that can simplify license management.

To solve the aforementioned problem, the present invention provides a storage system in which a first storage apparatus is connected to one or a plurality of second storage apparatuses and the first storage apparatus virtualizes each of the second storage apparatuses, wherein the first storage apparatus includes a first management unit for checking, based on a license key, which target the license key input from outside for setting a predetermined optional function has been issued, and transmits the license key to the corresponding second storage apparatus if the target to which the license key has been issued is the second storage apparatus; and the second storage apparatus includes a second management unit for setting the corresponding optional function in its own storage apparatus based on the license key transmitted from the first storage apparatus.

As a result, in this storage system, a user can make the second storage apparatus configure the settings for an optional function corresponding to a license key issued to the second storage apparatus by inputting this license key to the first storage apparatus. Accordingly, the setting operation for the optional function can be simplified compared with that of a conventional storage apparatus in which the optional function settings are configured separately in the first and second storage apparatuses.

Moreover, the present invention provides a license management method for a storage system in which a first storage apparatus is connected to one or a plurality of second storage apparatuses and the first storage apparatus virtualizes each of the second storage apparatuses, including: a first step in which the first storage apparatus checking, on a license key, which target the license key input from the outside for setting a predetermined optional function has been issued based, and transmits the license key to the corresponding second storage apparatus if the target to which the license key has been issued is the second storage apparatus; and a second step in which the second storage apparatus configures the settings for the corresponding optional function in its own storage apparatus based on the license key transmitted from the first storage apparatus.

According to this license management method, a user can make the second storage apparatus configure the settings for an optional function corresponding to a license key by inputting the license key issued to the second storage apparatus to the first storage apparatus. Accordingly, the setting operations for the optional function can be simplified compared with those for a conventional storage apparatus in which the settings for optional functions are configured separately in the first and second storage apparatuses.

Furthermore, the present invention provides a license management method for a storage system in which a first storage apparatus is connected to one or a plurality of storage apparatuses and the first storage apparatus virtualizes each of the second storage apparatuses, including: a first step in which when a second storage apparatus that has a license, being a permission to use a predetermined optional function, is connected to the first storage apparatus, the first storage apparatus requests that the second storage apparatus transmit the license for any capacity the second storage apparatus has; a second step in which the second storage apparatus transmits the license for leftover capacity that the second storage apparatus has to the first storage apparatus in response to the request;

and a third step in which the first storage apparatus manages the license transmitted from the second storage apparatus and grants the license to the first or second storage apparatus when necessary.

According to this license management method, licenses for various optional functions owned respectively by the first and second storage apparatuses forming the storage system are collectively managed by the first storage apparatus. Accordingly, the license management can be greatly simplified compared with license management performed separately in the first and second storage apparatuses. Moreover, the licenses that the first and second storage apparatuses have can be shared therebetween.

According to the present invention, license management can be simplified. Moreover, the economic burden on users can be reduced, since a common license is used between the first and second storage apparatuses.

BEST MODE OF CARRYING OUT THE INVENTION

An embodiment of the present invention will be described below with reference to the drawings.

(1) Configuration of a Storage System 1 According to the Embodiment

Figure 1:
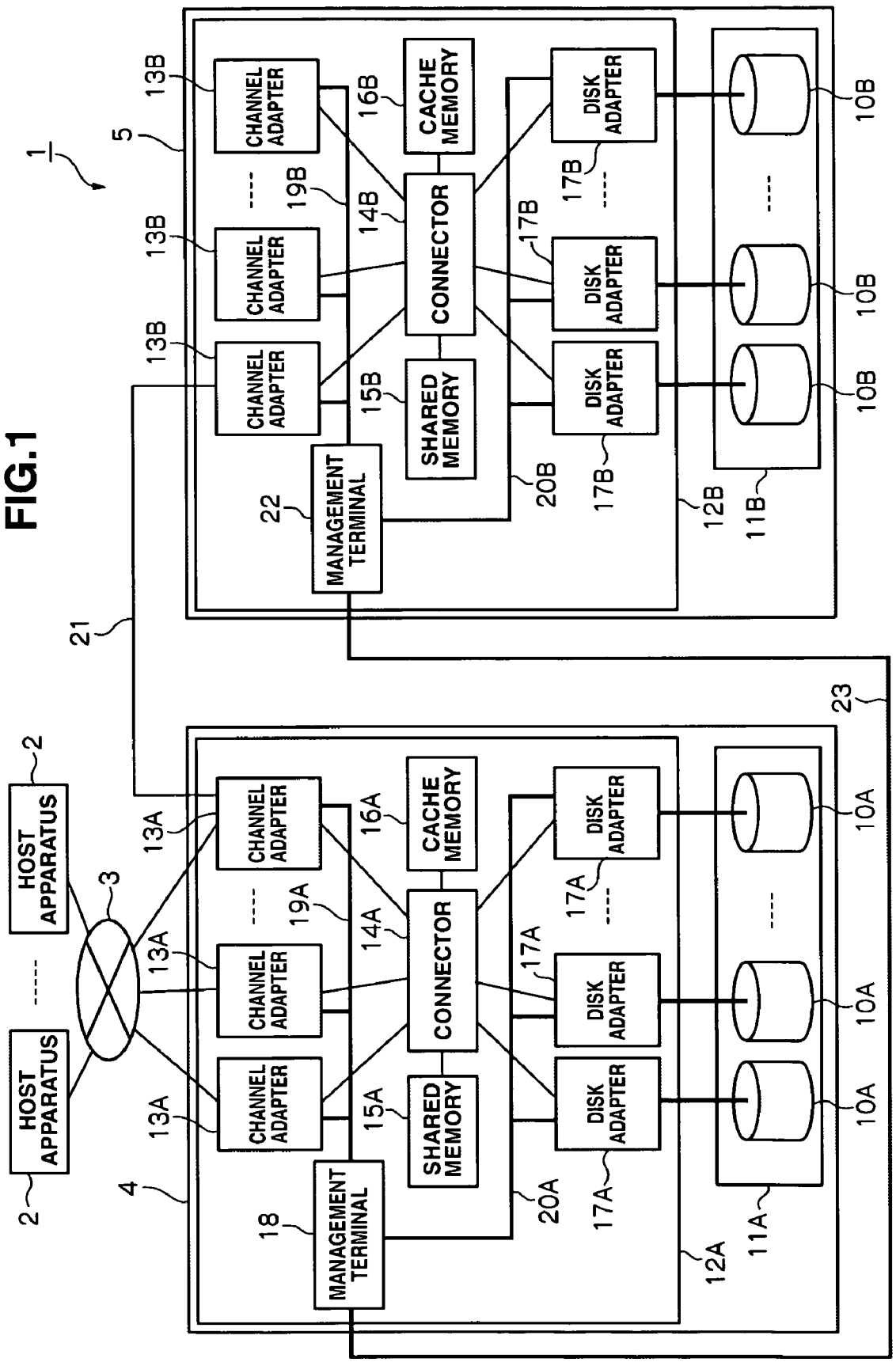
FIG. 1 is a block diagram showing the configurations of the storage system according to an embodiment of this invention.

FIG. 1 shows an example of a configuration of a storage system 1 according to the embodiment. In this storage system 1, a plurality of host devices 2 is connected via a network 3 to a master storage apparatus 4, and the master storage apparatus 4 is connected to a slave storage apparatus 5.

The host device 2, which is a host system, is a computer such as a personal computer, a workstation, or a mainframe, having information processing resources such as a CPU (Central Processing Unit) and memory. Each host device 2 includes an information input device (not shown) such as a keyboard, a switch or pointing device, or a microphone; and an information output device (not shown) such as a monitor display or a speaker.

The network 3 is formed by, e.g. a SAN (Storage Area Network), a LAN (Local Area Network), Internet, or a public or dedicated line. Communication between the host device 2 and the master storage apparatus 4 is performed via the network 3 in accordance with, e.g. Fibre Channel Protocol when the network 3 is a SAN, and in accordance with TCP/IP (Transmission Control Protocol / Internet Protocol) when the network 3 is a LAN.

The master storage apparatus 4 has a function that virtualizes a storage area provided by the slave storage apparatus 3 with respect to the host apparatus 2 and includes a storage device 11A formed by a plurality of disk devices 10A for storing data; and a control unit 12A that controls data input/output to/from the storage device 11A.

As a disk device 10A in the storage device 11A, an expensive disk such as a SCSI (Small Computer System Interface) disk, or an inexpensive disk such as a SATA (Serial AT Attachment) disk or an optical disk is used.

Each disk device 10A in the storage device 11A is operated by the control unit 12A using a RAID system. One or a plurality of logical volumes (hereinafter referred to as "logical volume(s)") is set on a physical storage area provided by one or a plurality of disk devices 10A. Data is stored in the logical volume, in which a block of a predetermined size (hereinafter referred to as "logical block") is a unit.

Each logical volume is provided with a unique identifier (hereinafter referred to as "LU: Logical Unit number"). In this embodiment, a combination of the LU and the number (hereinafter referred to as "LBA: Logical Block Address") that is provided and specific to each logical block is used as an address, and data input and output are conducted by designating the address.

The control unit 12A includes a plurality of channel adapters 13A; a connector 14A; shared memory 15A; cache memory 16A; a plurality of disk adapters 17A; and a management terminal 18.

Each channel adapter 13A is formed as a microcomputer system including a microprocessor, memory, and communication interfaces, and has ports to be connected respectively to the network 3 and the slave storage apparatus 5. Each channel adapter 13A interprets various commands transmitted from the host device 2 via the network 3 and executes the corresponding processing. A network address (e.g., an IP address or a WWN) with which the host device 2 can identify the respective ports is assigned to each port of the channel adapters 13A and the channel adapters 13A can act individually as NAS (Network Attached Storage).

The connector 14A is connected to the channel adapters 13A, the shared memory 15A, the cache memory 16A, and the disk adapters 17A. Data and commands are transmitted and received among the channel adapters 13A, the shared memory 15A, the cache memory 16A, and the disk adapters 17A via this connector 14A. The connector 14A is formed by a switch such as an ultrahigh-speed cross bus switch that transmits and receives data with high-speed switching, or a bus.

The shared memory 15A and the cache memory 16A are memories shared by the channel adapters 13A and the disk adapters 17A. The shared memory 15A is used mainly for storing system configuration information about the configurations of the entire master storage apparatus 4, and commands. The cache memory 16A is used mainly for temporarily storing data input and output to/from the master storage apparatus 4.

Each disk adapter 17A is a microcomputer system having a microprocessor and memory, and functions as an interface that controls protocols when communicating with the disk devices 10A in the storage device 11A. The disk adapter 17A is connected to the corresponding disk device 10A in the storage device 11A via a fibre channel cable, and exchanges data with the disk device 10A in accordance with Fibre Channel Protocol.

The management terminal 18 is a terminal device that controls operations of the entire master storage apparatus 4, and consists of a notebook type personal computer. The management terminal 18 is connected via a LAN 19A to each channel adapter 13A, and connected via a LAN 20A to each disk adapter 17A. The management terminal 18 monitors whether or not a failure occurs in the master storage apparatus 4, and displays a failure report on its display and blocks the corresponding disk device 10A in the storage device 11A in response to an operator's instruction when a failure occurs. The operator can define the system configuration information using the management terminal 18 and store the defined system configuration information in the shared memory 15A via the channel adapters 13A or the disk adapters 17A and the connector 14A.

The configuration of the slave storage apparatus 5 is substantially the same as that of the master storage apparatus 4, except for the processing in the management terminal 22 relating to license management for various optional functions that will be described later. In FIG. 1, each component of the slave storage apparatus 5 identical to one in the master storage apparatus 4 is provided with the same reference number, followed by a reference character "B" instead of "A." In the slave storage apparatus 5, a channel adapter 13B is connected via a signal line 21, such as a fibre channel cable or a LAN cable, to any of the channel adapters 13A in the master storage apparatus 4. Necessary commands and data can be exchanged with the master storage apparatus 4 through the signal line 21.

The management terminal 22 in the slave storage apparatus 5 is connected via a network 23, such as a LAN, to the management terminal 18 in the master storage apparatus 4. The management terminals 22 and 18 in the slave and master storage apparatuses 5 and 4 can transmit and receive relevant information to/from each other via the network 23.

Figures 2, 3:
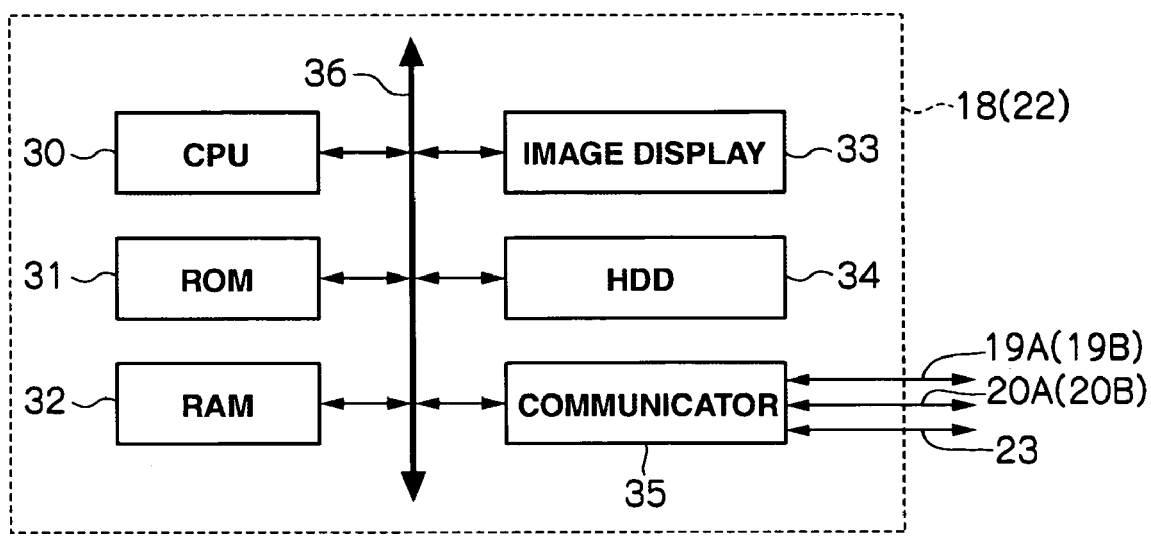
FIG. 2 is a block diagram showing the configurations of a management terminal.
FIG. 3 is a table illustrating a license key.

FIG. 2 shows the specific configuration example of the management terminals 18 and 22 in the master and slave storage apparatuses 4 and 5. As is clear from FIG. 2, each of the management terminals 18 and 22 includes a CPU 30; a ROM (Read Only Memory) 31 storing various control programs; a RAM (Random Access Memory) 32 as a work memory for the CPU 30; an image display 33 with a display for displaying relevant information and GUIs in response to user's instructions; a hard disk 34 storing various application software; and a communicator 35 that functions as an interface when the management terminals 18 and 22 communicate with the channel adapters 13A and 13B, the disk adapters 17A and 17B, and each other. The above components are mutually connected via a bus 36.

In this case, the hard disk drive 34 stores the application software relating to the license management described later, and the CPUs 30 in the master and slave storage apparatuses 4 and 5 separately read that application software from the hard disk drive 34, run the application software in the RAM 32, and execute various processing according to the software. By the above-described cooperation between the CPUs 30 in the master and slave storage apparatuses 4 and 5, processing relating to the license management described later is performed, and thereby the license management in the entire storage system 1 can be performed.

Here, flow of data input and output between the host device 2 and the master storage apparatus 4 in this storage system 1 will be described. When a command to write data to a logical volume set in the master or slave storage apparatus 4 or 5 is input by a user, the host device 2 transmits the corresponding data write request and write data to a predetermined channel adapter 13A in the master storage apparatus 4. The data write request contains a virtual address the write data is to be written to, which is a combination of a virtual LU provided to each of logical volumes set on the storage areas provided by the master and slave storage apparatuses 4 and 5 and a virtual LBA provided as a serial number to every logical block in the storage areas.

The channel adapter 13A in the master storage apparatus 4 that receives the data write request converts the virtual address the data is to be written to designated in the request into an actual address recognized by the master and slave storage apparatus 4 and 5. To that end, the shared memory 15A in the master storage apparatus 4 retains an address conversion table containing the actual addresses of the storage areas provided by the master and slave storage apparatuses 4 and 5 and corresponding virtual addresses of the storage areas recognized by the host device 2. Each channel adapter 13A refers to the address conversion table to convert the virtual address the data is to be written to contained in the data write request into an actual address recognized by the master and slave storage apparatuses 4 and 5.

When the converted address is an address in a storage area provided by the master storage apparatus 4, the channel adapter 13A writes this data write request in the shared memory 15A. The channel adapter 13A also writes the write data in the cache memory 16A.

The disk adapter 17A constantly monitors the cache memory 15A. When the disk adapter 17A detects that the data write request has been written in the shared memory 15A, it converts the data write request designating a virtual logical address into a data write request designating an actual physical address, reads the write data from the cache memory 16A, and writes the data at the position corresponding to the designated address in the disk device 10A.

On the other hand, when the address contained in the above-converted data write request is an address in a storage area provided by the slave storage apparatus 5, the channel adapter 13A transmits this data write request together with the write data to the slave storage apparatus 5 through the channel adapter 13A connected to the slave storage apparatus 5.

The channel adapter 13B in the slave storage apparatus 5 that receives the data write request writes the request in the shared memory 15B and writes the write data in the cache memory 16B. The data write request is then read by the corresponding disk adapter 17B. This disk adapter 17B converts the data write request designating a logical address into a data write request designating a physical address. Also, the disk adapter 17B reads the write data from the cache memory 16B and writes the data at the position corresponding to the address in the relevant disk device 10B.

When a command to read data stored in a predetermined logical volume in the master storage apparatus 4 is input by a user, the host device 2 transmits a data read request to a predetermined channel adapter 13A in the master storage apparatus 4 in response. This data read request contains a virtual address in which read data is written.

The channel adapter 13A in the master storage apparatus 4 that receives the data read request converts the virtual address from which the data is to be read from contained in the data read request into an actual address recognized by the master and slave storage apparatuses 4 and 5 by using the above address conversion table.

When the converted address is an address in a storage area provided by the master storage apparatus 4, the channel adapter 13A writes the data read request in the shared memory 15A. When the corresponding disk adapter 17A detects that the read command has been written in the shared memory 15A, it converts the data read request designating a logical address into a data read request designating a physical address, and reads the designated data from the position corresponding to the address in the corresponding disk device 10A.

The disk adapter 17A writes the data read from the disk device 10A in the cache memory 16A and writes the read command in the shared memory 15. The channel adapter 13A constantly monitors the shared memory 15A, and when the corresponding channel adapter 13A detects that the read command has been written in the shared memory 15A, it reads the corresponding data from the cache memory 16A in accordance with the read command and transmits the data via the network 3 to the corresponding host device 2.

Meanwhile, when the address contained in the above-converted data read request is an address in a storage area provided by the slave storage apparatus 5, the channel adapter 13A transmits that data read request to the slave storage apparatus 5 through the channel adapter 13A connected to the slave storage apparatus 5.

The channel adapter 13B in the slave storage apparatus 5 that receives the data read request writes the request in the shared memory 15B. The data read request is then read by the corresponding disk adapter 17B. Next, the disk adapter 17B converts the data read request designating a logical address into a data read request designating a physical address and reads the designated data from the position according to the address in the relevant disk device 10B based on that address.

The disk adapter 17B also writes the data read from the disk device 10B in the cache memory 16B, and writes the read command in the shared memory 15B. When the channel adapter 13B, which constantly monitors the cache memory 13, detects that the read command has been written in the shared memory 15B, it reads the corresponding data from the cache memory 16B in accordance with the read command and transmits the data to the master storage apparatus 4. As a result, this data is transmitted via the master storage apparatus 4 and the network 3 sequentially to the host device 2.

In this manner, in the storage system 1, the storage area provided by the slave storage apparatus 5 is virtualized by the master storage apparatus 4, while data is read and written from/to storage areas provided by the master storage apparatus 4 or the slave storage apparatus 5 in response to a user's data input/output requests.

(2) License Management Method in the Storage System 1
(2-1) Process of Installing a License Key in the Storage System 1

Next, a method for managing licenses for optional functions in this storage system 1 will be described. First, process of installing a license key in the master and slave storage apparatuses 4 and 5 will be described.

In the storage system 1, a user can receive a license key for a desired optional function when he/she pays a consideration to the manufacturer for that optional function of the various optional functions supported by the master storage apparatus 4 or the slave storage apparatus 5.

As shown in FIG. 3, the license key is information about the type of optional function the user receives a license for after paying consideration (hereinafter referred to as "optional function type information"); information about the capacity licensed for the optional function (hereinafter referred to as "licensed capacity information"); and information about the serial number of a target storage apparatus that receives a license for optional function (hereinafter referred to as "target storage information").

For example, the first line in FIG. 3 represents a 3[TB] license key for an optional function "A" given to a storage apparatus with the serial number "1000002," and the third line in FIG. 3 represents a 1[TB] license key for an optional function "E" given to a storage apparatus with the serial number "1000003."

A user can release the lock on an optional function in the master storage apparatus 4 or the slave storage apparatus 5 and enable the optional function by installing the license key delivered by the manufacturer on the management terminal 18 or 22 in the corresponding master storage apparatus 4 or the slave storage apparatus 5.

Figure 4:
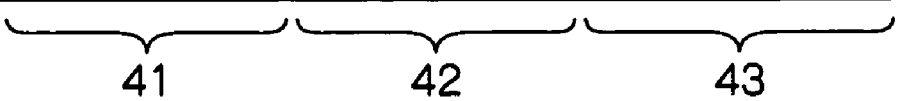
FIG. 4 is a table illustrating a license management table.

Therefore, the master and slave storage apparatuses 4 and 5 each have a license management table 40 in the shared memories 15A and 15B shown in FIG. 4, as means for managing optional functions licensed for its own storage apparatus and the capacity licensed for this optional function.

The license management table 40 has a support column 41, an installation column 42, and a capacity column 43 for each various optional functions ("#0," "#1," "#2," . . . ) provided by the manufacturer. Initially, entries in the support column 41 for optional functions supported by the master storage apparatus 4 or the slave storage apparatus 5 have the value "1," and those in the support column 41 for other optional functions (not supported by the master storage apparatus 4 or the slave storage apparatus 5) have the value "0." Also, in the initial state, that is, when no license key has been installed, all entries in the installation column 42 and capacity column 43 have the value "0."

Every time a license key for an optional function is installed to its own storage apparatus, each of the master and slave storage apparatuses 4 and 5 stores the value "1" in an entry in the installation column 42 corresponding to the installed optional function in the license management 40 and the capacity licensed for the optional function by terabyte (TB) in an entry in the corresponding capacity column 43. The storage apparatus thus manages the optional functions its own storage apparatus has received a license for and the capacity licensed for the optional function.

Here, in this storage system 1, not only the license key for the optional function the master storage apparatus 4 has received a license for, but also the license key for the optional function the slave storage apparatus 5 has received a license for is input to the master storage apparatus 4. Those license keys are thereby transmitted automatically from the master storage apparatus 4 to the slave storage apparatus 5, and the slave storage apparatus 5 automatically installs them. This process is a characteristic of the present invention.

Figure 5:
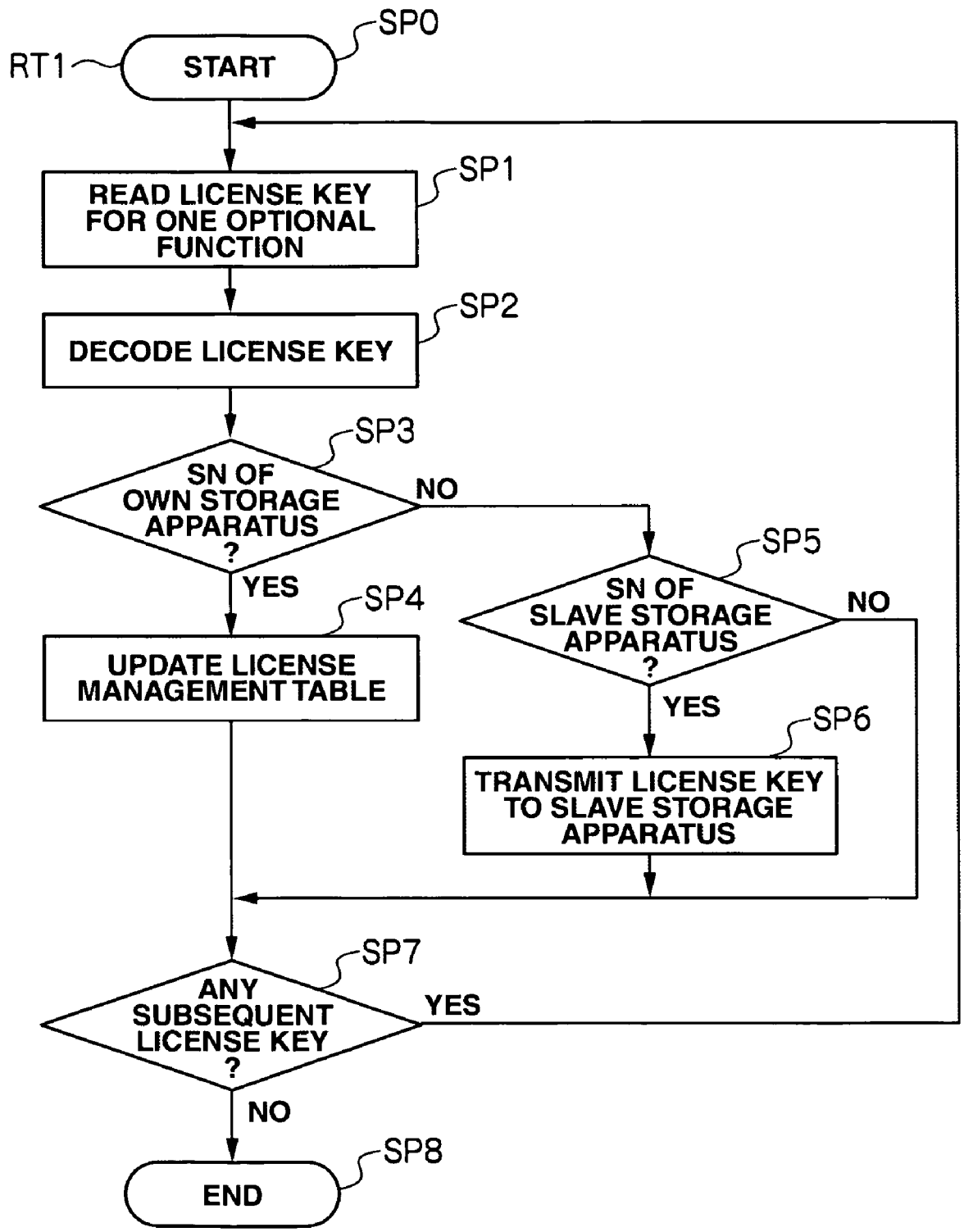
FIG. 5 is a flow chart illustrating processing for installing a license key.

FIG. 5 is a flow chart showing a processing sequence for the CPU 30 in the management terminal 18 in the master storage apparatus 4, relating to the operation of installing a license key for the master and slave storage apparatuses 4 and 5 (hereinafter referred to as "license key installation processing sequence RT 1").

When a command to install a license key is input after a license key installation operation mode is selected and the license keys for one or a plurality of optional functions are input by user, the CPU 30 begins the license key installation processing sequence RT1 (SP0). First, the CPU 30 reads a license key for one optional function input from among the above-input license keys (SP1).

The license key is coded before being delivered to the user. Therefore, the CPU 30 decodes the above-read license key for an optional function (SP2), and then checks whether or not the target storage information contained in the decoded license key contains the serial number of its own storage apparatus (SP3).

If the result of this check is YES (SP3: YES), the license key for the optional function has been issued to its own storage apparatus (the license has been given to the master storage apparatus 4). Then, the CPU 30 installs the license key, i.e., updates the license management table 40 based on this license key. Specifically, the CPU 30 stores the value "1" in the installation column 42 in the license management table 40, and stores the capacity licensed for the optional function obtained based on the licensed capacity information contained in the license key to the capacity column 43 in the license management table (SP4). The CPU 30 then checks whether or not there is another license key (SP7).

On the other hand, if the result of the check in step SP3 is NO (SP3: NO), the license key for the optional function has not been issued to its own storage apparatus (the license has not been given to the master storage apparatus 4). Here, the CPU 30 checks whether or not the license key has been issued to the slave storage apparatus 5 connected to its own storage apparatus based on the target storage information contained in this license key (SP5).

If the result of this check is YES (SP5: YES), the CPU 30 transmits the license key to the slave storage apparatus 5 (SP6). As a result, the above-described processing in step SP4 is performed in the same way for the slave storage apparatus 5, based on the license key, and this license key is installed for the slave storage apparatus 5. After that, the CPU 30 checks whether or not there is another license key (SP7).

On the other hand, if the-check result in step SP5 is NO (SP5: NO), the license key for the optional function has been issued for neither its own storage apparatus nor the slave storage apparatus 5. Then, the CPU 30 terminates the processing for the license key and checks whether or not there is another license key (SP7). If the result of this check is YES (SP7: YES), the CPU 30 repeatedly performs the above-described processing, changing the license key the processing is performed for (SP1 to SP7).

When the processing has been performed on all license keys and the result in step SP7 becomes NO (SP7: NO), the CPU 30 ends the above license key installation processing (SP8).

Figure 6:
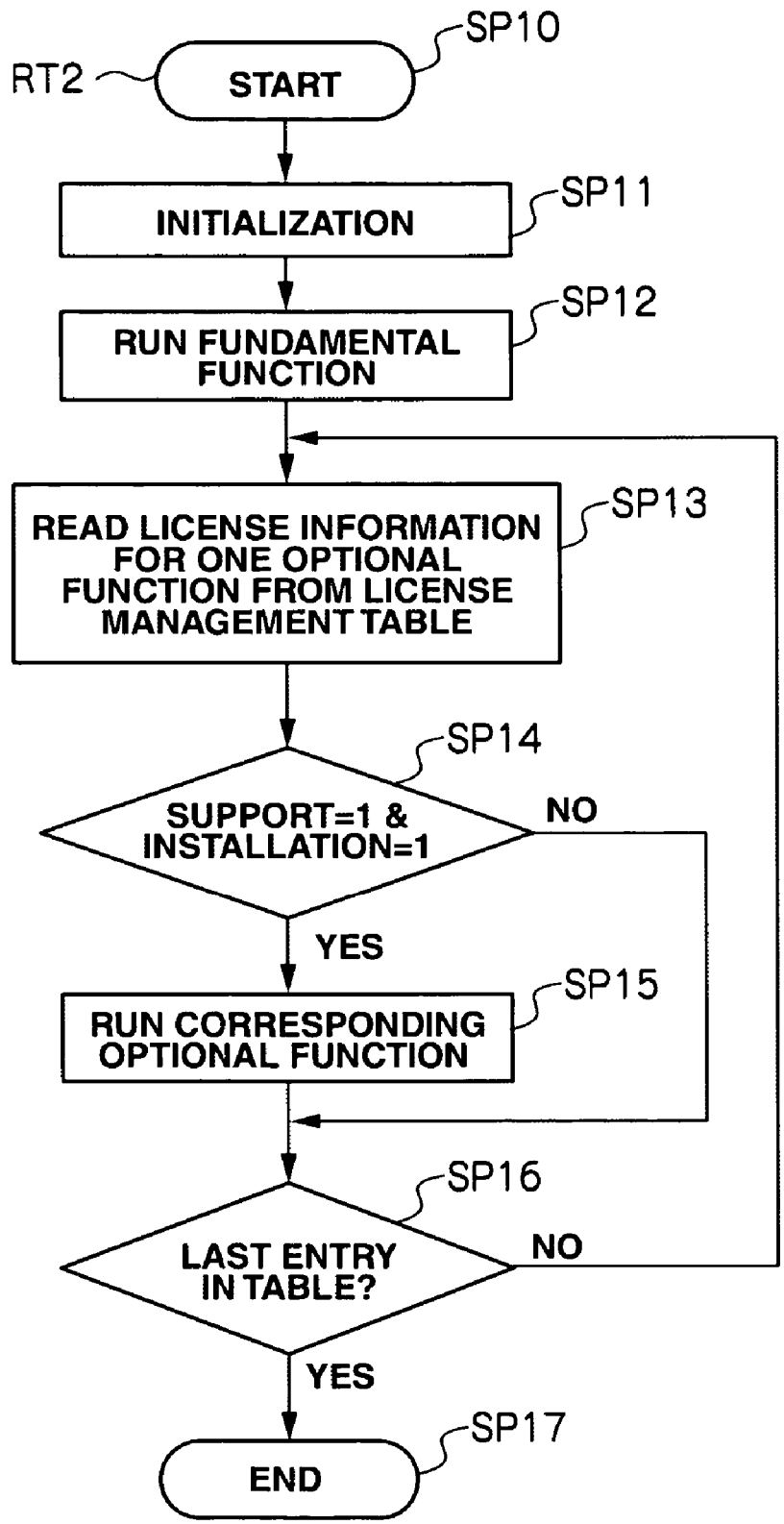
FIG. 6 is a flow chart illustrating start-up processing for master and slave storage apparatuses.

FIG. 6 is a flow chart showing a processing sequence for starting up the CPU 30 (hereinafter referred to as "start-up processing sequence RT2_") in the management terminal 18 and 22 when power is applied to the master storage apparatus 4 or the slave storage apparatus 5.

When power is applied to the master storage apparatus 4 or the slave storage apparatus 5, the CPU 30 begins the start-up processing sequence RT2 (SP10). First, the CPU 30 formats various settings preset in its own storage apparatus (SP11). Next, the CPU 30 runs the basic functions necessary for its own storage apparatus (the master storage apparatus 4 or the slave storage apparatus 5) to perform basic operations to read various system information including the license management table 40 from the disk unit 10A or 10B referred to as a system disk that stores system information, and store the information to the shared memory 15A or 15B (SP12).

After that, the CPU 30 reads the optional function type information, licensed capacity information, and target storage information for one optional function (hereinafter collectively referred to as "license management information") registered in the license management table 40 stored in the shared memory 15A or 15B (SP13), and then checks whether or not the values of both the support column 41 and the installation column 42 are "1," or whether or not its own storage apparatus supports the optional functions and a license key for this optional function has been installed for its own storage apparatus (SP14).

If the result in this check is NO (SP14: NO), the CPU 30 proceeds to the processing in step SP16. If the result is YES (SP14: YES), the CPU 30 executes predetermined processing for running the optional function, such as settings for the channel adapters 13A and 13B and the disk adapters 17A and 17B (SP15) . The CPU 30 then checks whether or not the above-described processing has been finished for the last optional function registered in the license management table 40 (SP16).

If the result of the check is NO (SP16: NO), the CPU 30 sequentially executes the above processing on each of the other remaining optional functions registered in the license management table 40 (SP13 to SP16). In this manner, various optional functions supported by the master storage apparatus 4 or the slave storage apparatus 5 and for which a license key has been installed from among those registered in the license management table 40, are sequentially run.

When the CPU 30 finishes executing the processing for all optional functions registered in the license management table 40 (SP16: YES), the start-up processing ends (SP17).

As described above, in the storage system 1 the management terminal 18 in the master storage apparatus 4 allots a license key input to this management terminal 18 to the corresponding slave storage apparatus 5, and the management terminal 22 in the slave storage apparatus 5 installs the license key allotted to its own storage apparatus and make the necessary settings. Accordingly, the license management for the respective optional functions in the entire storage system 1 can be easily performed.

(2-2) License Management in the Master Storage Apparatus 4

Next, a license management method performed by the master storage apparatus 4 in the storage system 1 will be described.

Figure 7:
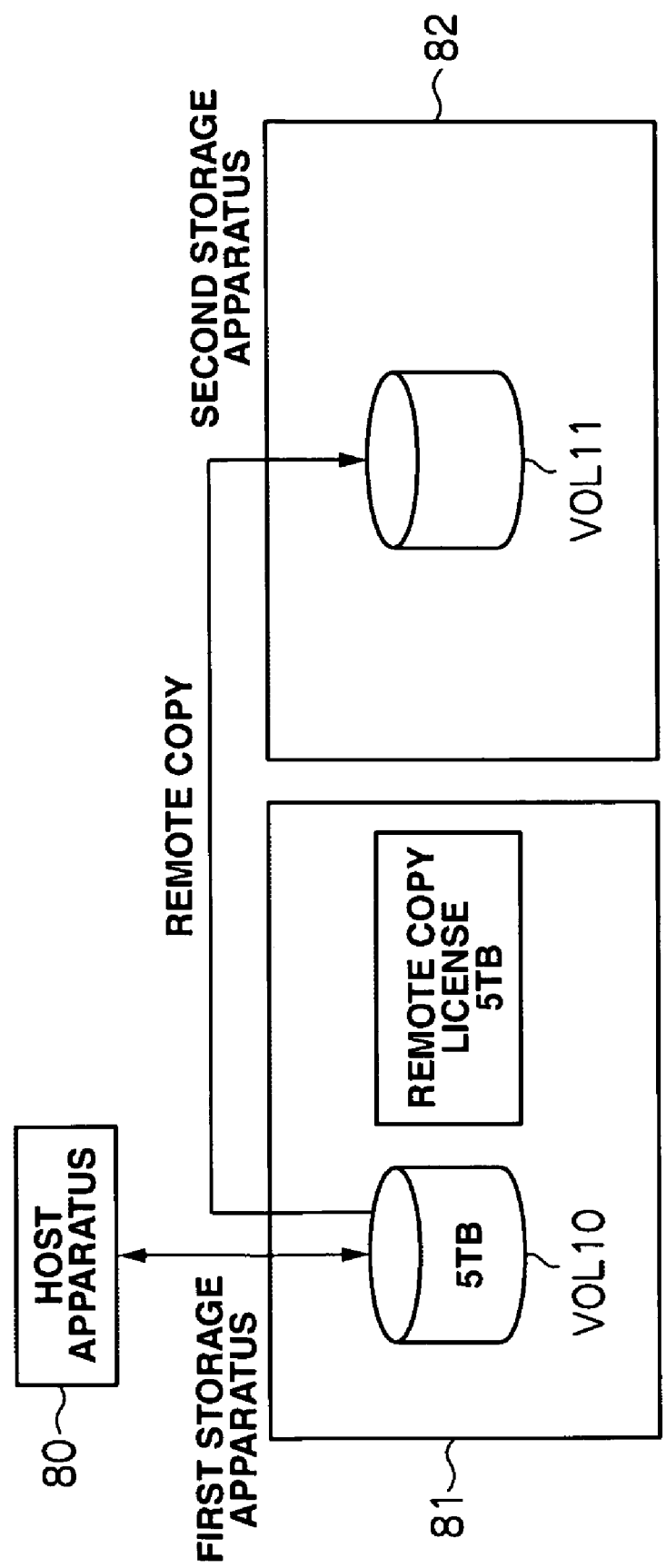
FIG. 7 is a block diagram illustrating license management performed by a master storage apparatus.
Figure 8:
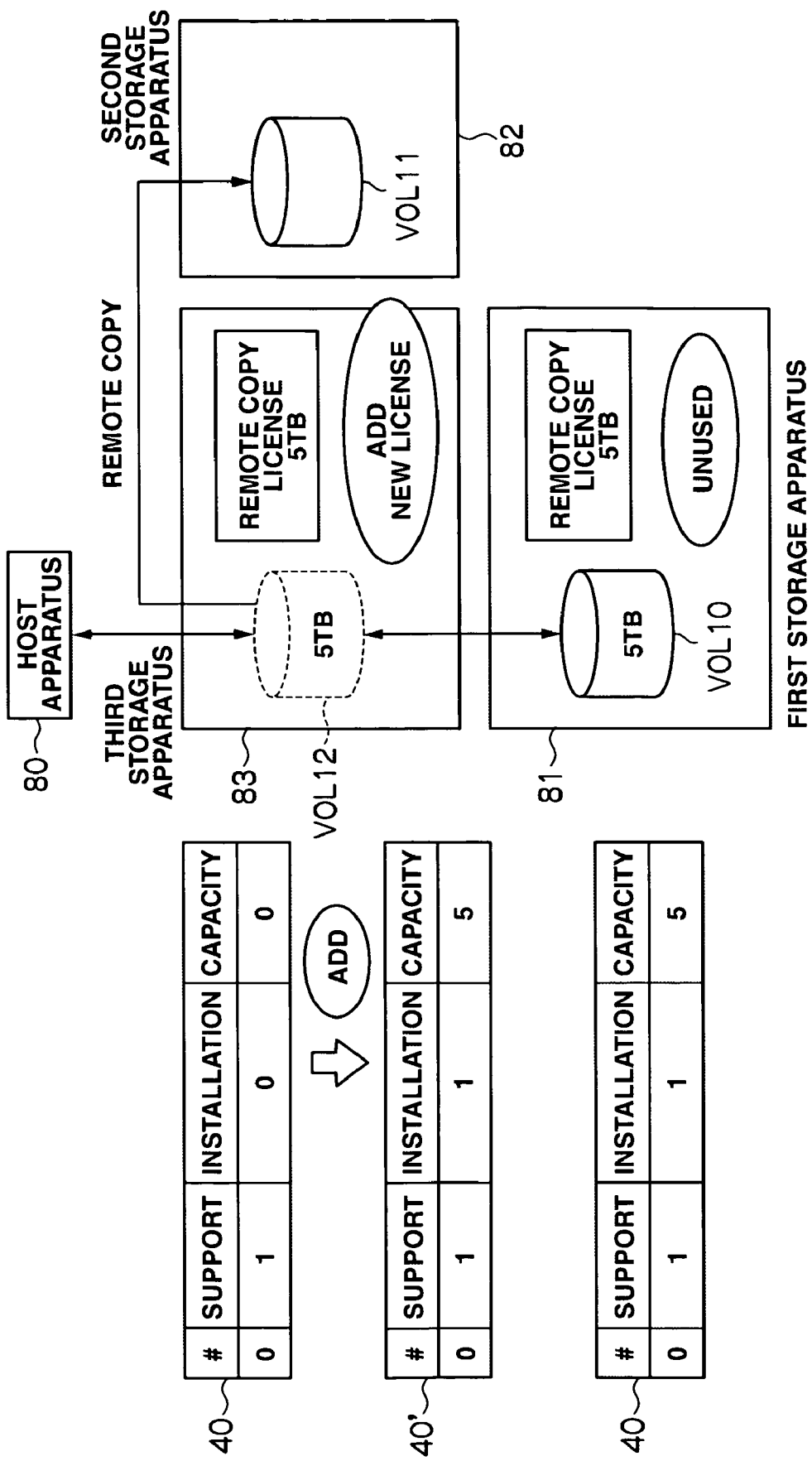
FIG. 8 is a block diagram illustrating license management performed by a master storage apparatus.
Figure 9:
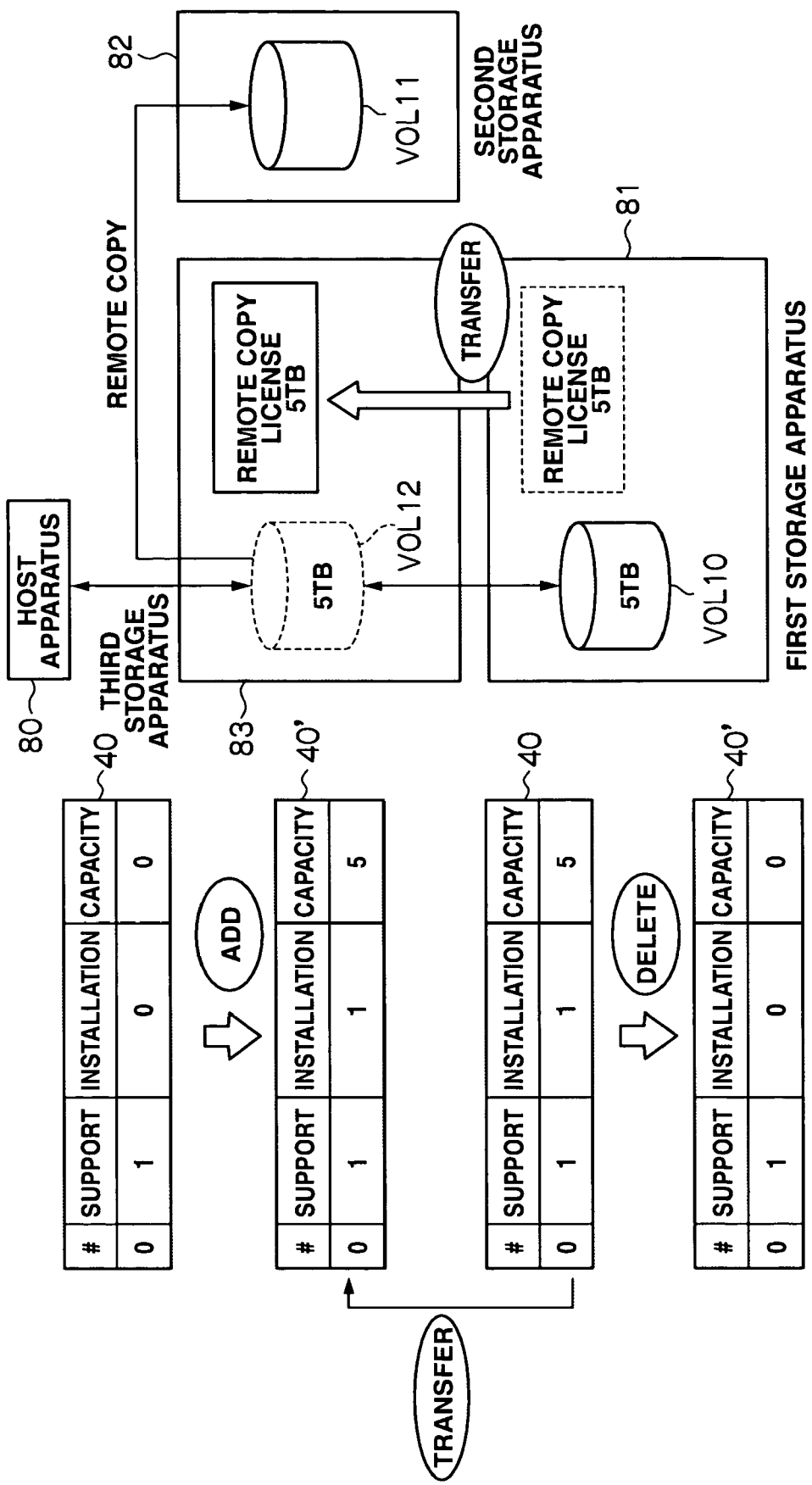
FIG. 9 is a block diagram illustrating license management performed by a master storage apparatus.

When a first storage apparatus 81 connected to a host device 80 as shown in FIG. 7 is used as an external storage apparatus of a third storage apparatus 83 as shown in FIG. 8, a license for an optional function that has been given to and used in the first storage apparatus 81 becomes unnecessary. However, when a volume in the first storage apparatus 81 is the target of the optional function in the third storage apparatus 83, it is necessary to also give the license for that optional function to the third storage apparatus 83.

As shown in FIG. 7, where the first storage apparatus 81 has a 5 [TB] license for remote copy and data in the 5 [TB] volume VOL 10 in the first storage apparatus 81 has been remote copied to a volume VOL 11 in the second storage apparatus 82, when the third storage apparatus 83 virtualizes the volume VOL 10 in the first storage apparatus 81 and remote copies the data in the thus-virtualized volume VOL 12 to the volume VOL 11 in the second storage apparatus 82 as shown in FIG. 8, the third storage apparatus 83 has to receive a 5[TB] license. Accordingly, although the first storage apparatus 81 has the 5 [TB] license for the remote copy, the third storage apparatus 83 has to separately obtain a 5 [TB] license for the remote copy function.

Meanwhile, when the first storage apparatus 81 is connected to the third storage apparatus 83, if the license of the first storage apparatus 81 that becomes unnecessary can be transmitted to the third storage apparatus 83 as shown in FIG.

9, the volume VOL 10 in the externally connected first storage apparatus 81 can be used for the optional function in the third storage apparatus 83.

Therefore, a license that the slave storage apparatus 5 already has for capacity that is currently not being used in the slave storage apparatus 5 is transmitted to the master storage apparatus 4 at the point in time when the slave storage apparatus 5 that already has licenses for various optional functions is connected to the master storage apparatus 4. The transmitted licenses are collectively managed in the master storage apparatus 4, which is another characteristic of the present invention.

Figure 10:
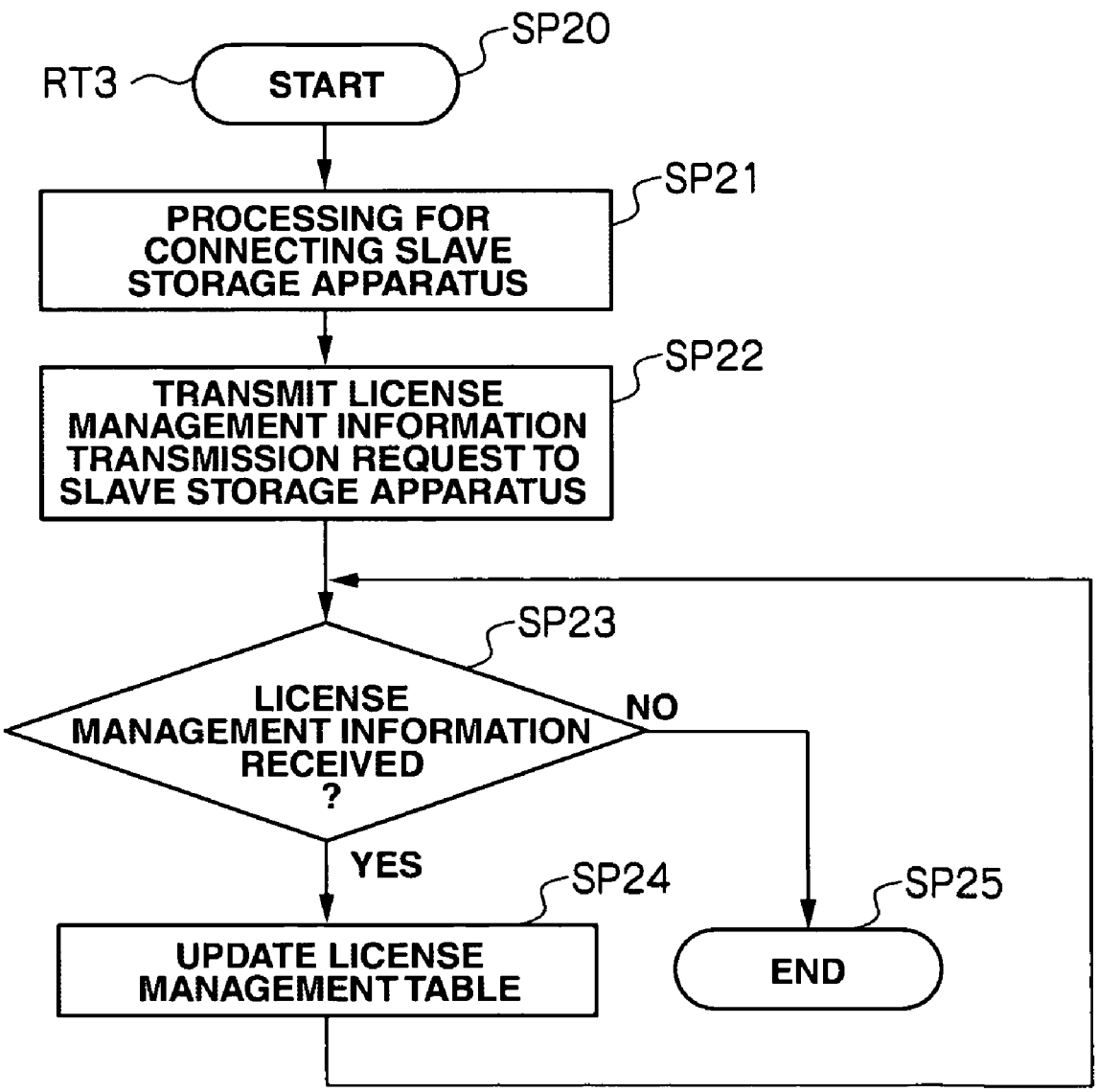
FIG. 10 is a flow chart illustrating operations relating to license collection in a master storage apparatus.
Figure 11:
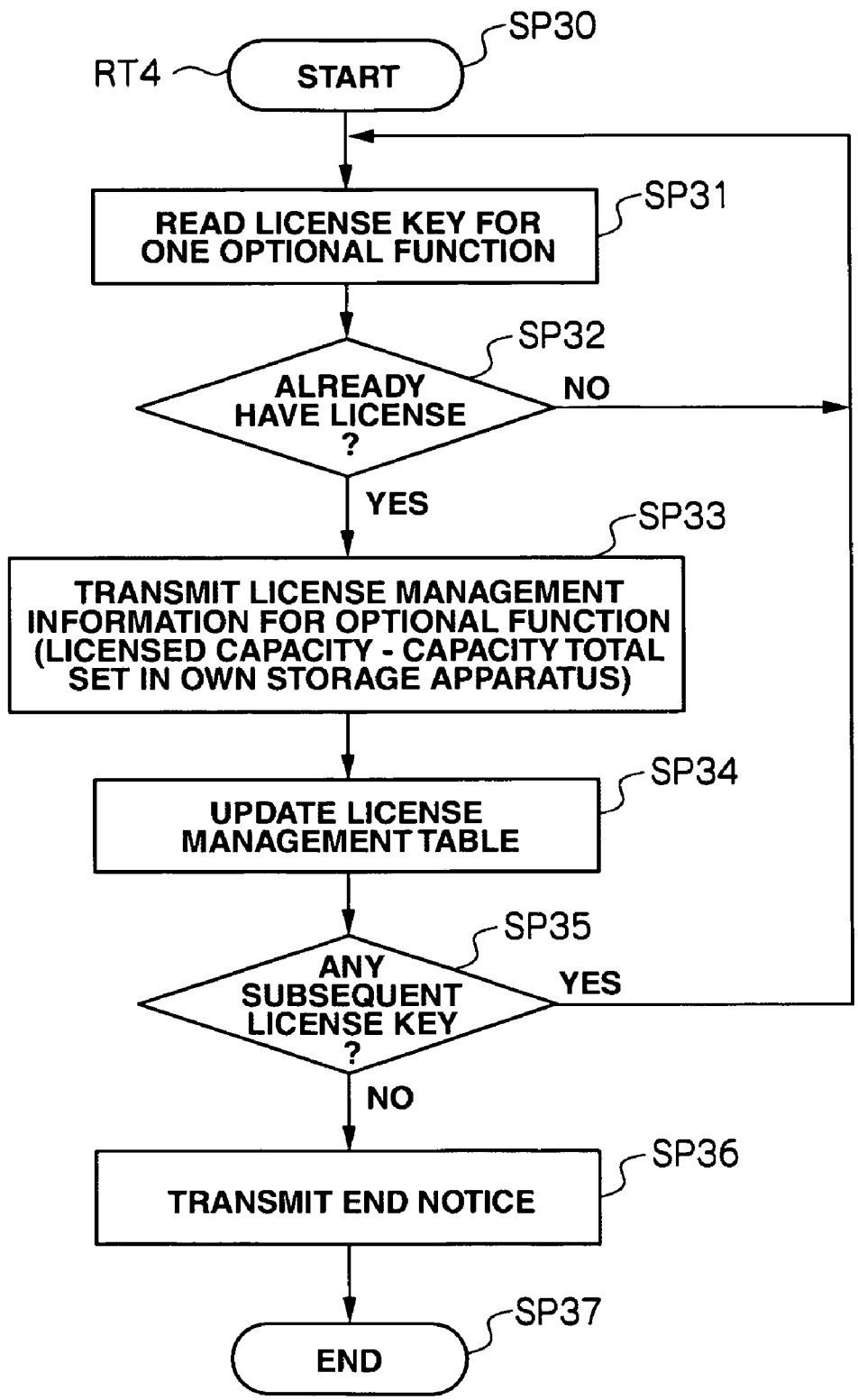
FIG. 11 is a flow chart illustrating operations relating to license collection in a slave storage apparatus.

In practice, when the slave storage apparatus 5 is connected to the master storage apparatus 4, the management terminal 18 in the master storage apparatus 4 succeeds to the licenses for optional functions that are not being used at that point in time by the slave storage apparatus 5 and the those being used by the slave storage apparatus 5 for leftover capacity in accordance with a processing sequence (hereinafter referred to as "master side license succession processing sequence RT3") shown in FIG. 10.

That is, when the slave storage apparatus 5 is connected to the master storage apparatus 4, the CPU 30 in the management terminal 18 in the master storage apparatus 4 begins the master side license succession processing sequence RT3 (SP20), and first executes predetermined connection processing for virtualizing the storage area provided by the slave storage apparatus 5, such as predetermined mapping processing and processing for producing the previously-mentioned address conversion table (SP21).

After that, the CPU 30 transmits a license management information transmission request, or a request to transmit the license management information about each optional function the slave storage apparatus has a license for to the master storage apparatus 4, via the network 23 to the management terminal 22 in the slave storage apparatus 5 (SP22). As a result, the management terminal 22 in the slave storage apparatus 5 sequentially transmits the license management information about each optional function the slave storage apparatus 5 has a license for via the network 23 to the management terminal 18 in the master storage apparatus 4, as described later. However, the management terminal 22 in the slave storage apparatus 5 transmits the license management information including licensed capacity information that indicates the leftover capacity of the license for the optional function(s) currently being used.

When the CPU 30 in the master storage apparatus 4 receives the license management information for an optional function from the management terminal 22 in the storage apparatus 5 within a predetermined period of time (SP23: YES), the CPU 30 updates the license management table 40 held in the shared memory 15A in the master storage apparatus 4 so that the master storage apparatus 4 succeeds to the license for the optional function that has been given to the slave storage apparatus 5, based on the license management information (SP24).

For example, when the master storage apparatus 4 has not received a license for a certain optional function (in the license management table 40 in the master storage apparatus 4, both corresponding values in the installation column 42 and capacity column 43 are "0") but the slave storage apparatus 5 has a 12 [TB] license for this optional function (in the license management table 40 in the slave storage apparatus 5, the corresponding values in the installation column 42 and capacity column 43 are "1" and "12," respectively) and is not using the optional function at all at the moment, the values in the corresponding installation column 42 and capacity column 43 in the license management table 40 in the master storage apparatus 4 are updated to "1" and "12," which are the same values as the corresponding values in the installation column 42 and capacity column 43 in the original license management table 40 in the slave storage apparatus 5.

Also, for example, when the master storage apparatus 4 has a 15 [TB] license for an optional function (in the license management table 40 of the master storage apparatus 4, the corresponding values in the installation column 42 and capacity column 43 are "1" and "15," respectively), and the slave storage apparatus 5 has a 12 [TB] license for that optional function and is using 3[TB] of the licensed capacity (in the license management table 40 in the slave storage apparatus 5, the corresponding values in the installation column 42 and capacity column 43 are "1"and "9," respectively), the value of the corresponding capacity column 43 in the license management table 40 in the master storage apparatus 4 is updated to "24," which is the sum of 15 and 9.

However, if the license management information from the slave storage apparatus 5 is about an optional function that is not supported by the master storage apparatus 4, the license succession for that optional function from the slave storage apparatus 5 to the master storage apparatus 4 is banned. Accordingly, the license management table 40 in the master storage apparatus 4 5 is not updated therefor.

The CPU 30 in the master storage apparatus 4 repeats the above-described processing (SP23-SP24-SP23) until it receives an end notice described below from the slave storage apparatus 5 or until it becomes unable to receive the license management information within a predetermined period of time. In this manner, among licenses for various optional functions that the slave storage apparatus 5 has, licenses for the optional functions that is currently not being used by the slave storage apparatus 5 and those for the leftover capacity while the slave storage apparatus 5 is currently using that optional function for part of the licensed capacity are taken over by the master storage apparatus 4.

After that, when the CPU 30 receives the end notice described below from the slave storage apparatus 5 or becomes unable to receive the license management information within a predetermined period of time, it ends the license succession processing (SP25).

At this point in time, when the management terminal 22 in the slave storage apparatus 5 receives a license management information transmission request transmitted from the master storage apparatus 4 in step SP22 in the processing sequence RT3, the management terminal 22 transmits the license management information about each optional function the slave storage apparatus 5 has the license for to the master storage apparatus 4 in accordance with a processing sequence (hereinafter referred to as "license management information request reception processing sequence RT4).

That is, when the CPU 30 in the management terminal 22 in the slave storage apparatus 5 receives the license management information transmission request from the master storage apparatus 4 via the network 23, it begins the license management information request reception processing sequence RT4 (SP30). First, the CPU 30 reads the license management information for a first optional function registered in the license management table 40 stored in the shared memory 15B (SP31).

Subsequently, the CPU 30 checks whether or not its own storage apparatus already has the license for that optional function based on the value in the installation column 42 for this optional function in the license management table 40 (SP32). If the result is NO (SP32: NO), the CPU 30 returns to step SP 31.

On the other hand, if the check result in step SP32 is YES (SP32: YES), the CPU 30 transmits the license management information for that optional function via the network 23 to the management terminal 18 in the master storage apparatus 4 (SP33). If part of the capacity licensed for that optional function is being used, the CPU 30 transmits the license management information indicating the leftover licensed capacity to the master storage apparatus 4.

After that, the CPU 30 in the slave storage apparatus 5 updates the value in the capacity column 43 corresponding to that optional function in the license management table 40 stored in the shared memory 22 to "0" when the function is not being used, or to the value of the capacity in use when part of the capacity licensed for the optional function is being used (SP34).

The CPU 30 then checks whether or not the license management table 40 contains a subsequent optional function (SP35). If the result is YES (SP35: YES), the CPU 30 executes the above-described processing on other optional functions registered in the license management table 40 (SP31 to SP35), sequentially switching the optional function to be the target of the processing. In this manner, the license management information about each optional function the slave storage apparatus 5 has a license for is sequentially transmitted via the network 23 to the management terminal 18 in the master storage apparatus 4.

When the CPU 30 completes the processing for all optional functions (SP35: YES), it transmits an end notice via the network 23 to the management terminal 18 in the master storage apparatus 4 (SP36), and then ends the license management information request reception processing sequence RT4 (SP37).

Meanwhile, in this storage system 1, when an instruction to set a new optional function is input by a user, the management terminal 22 in the slave storage apparatus 5 confirms the capacity licensed for this optional function and configures the settings for it if there is sufficient capacity. If the licensed capacity is insufficient, the management terminal 22 requests a license for the insufficient capacity from the master storage apparatus 4, and then performs settings for the optional function when this license is received from the master storage apparatus 4.

Figure 12:
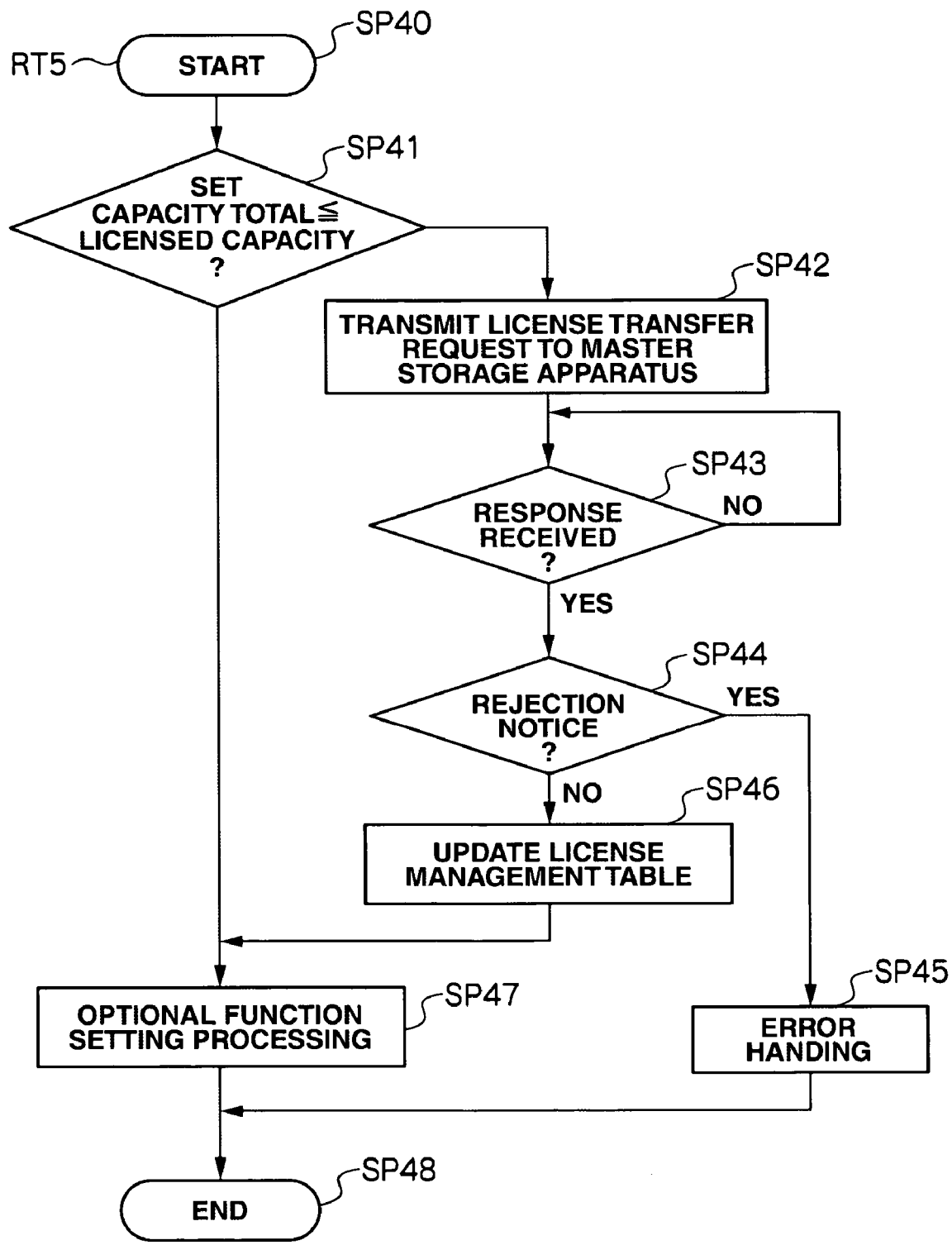
FIG. 12 is a flow chart illustrating operations in a slave storage apparatus relating to optional function settings in a slave storage apparatus.

FIG. 12 is a flow chart showing a processing sequence (hereinafter referred to as "optional function setting processing sequence RT5") relating to the optional function setting processing in the management terminal 22 in the slave storage apparatus 5.

When an instruction to set a new optional function is input by a user, the CPU 30 in the management terminal 22 in the slave storage apparatus 5 begins the optional function setting processing sequence RT5 (SP40). First, the CPU 30 refers to the license management table 40 stored in the shared memory 15B and checks whether or not the capacity set in its own storage apparatus is equivalent to or more than the total capacity required for the new optional function to be set according to the setting instruction (SP41).

If the result of the check is YES (SP41: YES), the CPU 30 executes the below-described optional function setting processing (SP47). On the other hand, if the result is NO (SP41: NO), the CPU 30 transmits a request to transfer the license for insufficient capacity for the optional function (hereinafter referred to as "license transfer request") via the network 23 to the management terminal 18 in the master storage apparatus 4 (SP42). As a result, as described later, the management terminal 18 in the master storage apparatus 4 transmits a permission notice for transferring the license for a predetermined capacity or a notice of rejecting the transfer of the license as a response.

After transmitting the license transfer request, the CPU 30 waits for the response from the master storage apparatus 4 (SP43). When receiving the response (SP43: YES), the CPU 30 checks whether or not the response is a rejection notice (SP44). If the result is YES (SP44: YES), the CPU 30 displays an error report on a display in the management terminal 22 (SP45), and ends the optional function setting processing (SP48).

Meanwhile, when the response from the storage apparatus 4 is not a rejection notice (SP44: NO), the CPU 30 updates the values in the installation column 42 and capacity column 43 corresponding to the optional function in the license management table 40 stored in the shared memory 15A in the slave storage apparatus 5 as appropriate (SP46).

Specifically, if the slave storage apparatus 5 does not have a license for the optional function and no capacity for the optional function has been set (both values of the corresponding installation column 42 and capacity column 43 in the license management table 40 are "0") and a 12 [TB] license for this optional function is transferred from the management terminal 18 in the master storage apparatus 4, the CPU 30 sets the value in the installation column 42 corresponding to the optional function in the license management table 40 to "1" and sets the value of the corresponding, capacity column 43 to "12."

Also, if a 10 [TB] license for the optional function has already been set for the slave storage apparatus 5 (the values in the corresponding installation column 42 and capacity column 43 in the license management table 40 are "1" and "10," respectively) and a 6 [TB] license for this function is transferred from the master storage apparatus 4, the CPU 30 updates the value in the capacity column 43 corresponding to the optional function 40 in the license management table 40 as "16," being the sum of 10 and 6.

When the CPU 30 finishes updating the license management table 40, it then executes predetermined optional function setting processing for changing the settings for the optional function the license management table 40 has been updated for (SP47), and ends the optional function setting processing (SP48).

Meanwhile, when the management terminal 18 in the master storage apparatus 4 receives the license transfer request from the slave storage apparatus 5 in step SP43 in the above processing sequence, the management terminal 18 transmits a response to the license transfer request to the slave storage apparatus 5 in accordance with a processing sequence (hereinafter referred to as "license transfer request reception processing sequence RT6") shown in FIG. 13.

That is, when the CPU 30 in the management terminal 18 in the master storage apparatus 4 receives the above license transfer request transmitted via the network 23 from the management terminal 22 in the slave storage apparatus 5, the CPU 30 begins the license transfer request reception processing sequence RT6 (SP50). First, the CPU 30 checks whether or not the result of adding the total capacity that has already been set in the master storage apparatus 4 for the optional function the license transfer request is sent for from the slave storage apparatus 5 and the capacity for the optional function requested from the slave storage apparatus 5 is equivalent to or less than the value stored in the capacity column 43 corresponding to the optional function in the license management table 40 stored in the shared memory 15A in the master storage apparatus 4, namely the capacity licensed for the optional function (SP51).

If the result is YES in the check (SP 51: YES), the CPU 30 transmits a permission notice to transfer the license for the capacity required for the corresponding optional function via the network 23 to the management terminal 18 in the slave storage apparatus 5 (SP52).

The CPU 30 also updates the value in the capacity column 43 corresponding to the optional function in the license management table 40 stored in the shared memory 15A in its own storage apparatus to the value remaining after the capacity for the license transferred to slave storage apparatus 5 is subtracted (SP53), and ends the optional function setting processing (SP55).

On the other hand, if the check result in step SP51 is NO (SP51: NO), the CPU 30 transmits a rejection notice via the network 23 to the management terminal 22 in the slave storage apparatus 5 (SP54) and ends the optional function setting processing (SP55).

As described above, in the storage system 1, the master storage apparatus 4 collects the licenses for various optional functions that the slave storage apparatus 5 connected to the master storage apparatus 4 has at the point in time when the slave storage apparatus 5 is connected to the master storage apparatus 4, manages those licenses collectively with the licenses that its own storage apparatus has, and transfers a license for necessary capacity from the master storage apparatus 4 to the slave storage apparatus 5 in response to a request from the slave storage apparatus 5. Accordingly, the license management for each optional function in the entire storage system 1 can be performed easily.

Moreover, because the licenses for various optional functions that the master and slave storage apparatuses 4 and 5 have are collectively managed in the master storage apparatus 4 in the storage system 1, a license for a certain optional function can be shared and used by the master and slave storage apparatuses 4 and 5. Accordingly, it is unnecessary to purchase a license for one optional function separately for the master and slave storage apparatuses 4 and 5 as in a conventional storage system, and so the economic burden on a user can be further reduced.

(2-3) License Management for a Remote Copy Function

Next, the above-described license management for an optional function, more particularly the license management for a remote copy function will be described below in detail.

Figure 14:
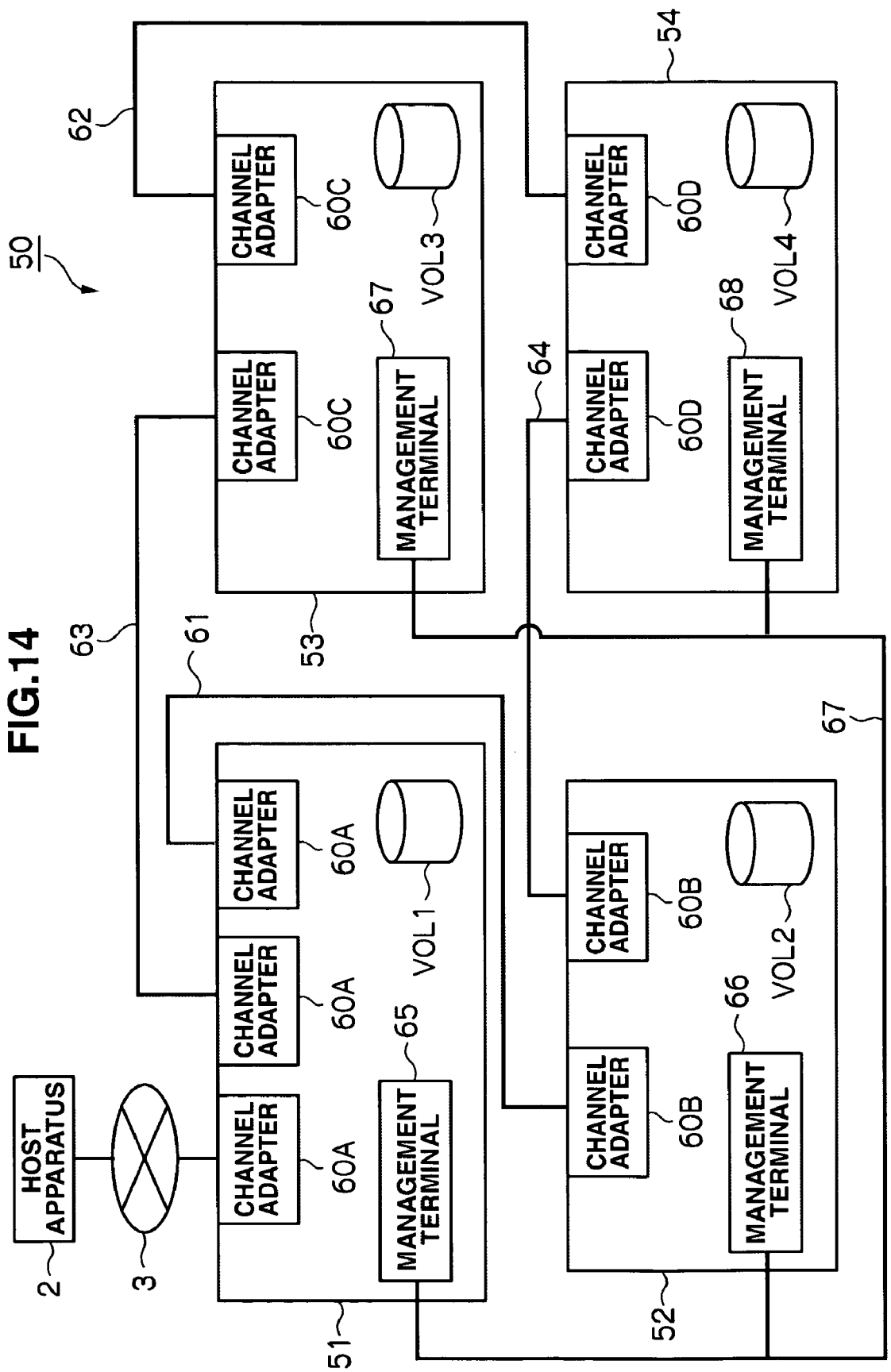
FIG. 14 is a block diagram illustrating the license management method according to an embodiment of the invention applied to a remote copy function.

FIG. 14 shows the configurations of a storage system 50 including four storage apparatuses 51 to 54, in which the reference characters used are identical to those in FIG. 1. Although the specific components in the storage apparatuses 51 to 54 are omitted in FIG. 14, all of them have the same configurations as the master storage apparatus 4 (and slave storage apparatus 5) described referring to FIG. 1.

In this storage system 50, one of channel adapters 60A in a first storage apparatus (hereinafter referred to as "primary master storage apparatus") 51 connected via the network 3 to the host device 2 is connected to one of channel adapters 60B in a second storage apparatus (hereinafter referred to as "primary slave storage apparatus") 52 via a signal line 61, such as a fibre channel cable, so that the primary master storage apparatus 51 and the primary slave storage apparatus 52 can transmit and receive data to/from each other via the signal line 61. The primary master storage apparatus 51 can virtualize a storage area provided by the primary slave storage apparatus 52 in the same manner as the master storage 4 can with the slave storage apparatus 5 as described above referring to FIG. 1.

Similarly, in the storage system 50, one of channel adapters 60C in a third storage apparatus (hereinafter referred to as "secondary master storage apparatus") 53 is connected to one of channel adapters 60D in a fourth storage apparatus (hereinafter referred to as "secondary slave storage apparatus") 54 via a signal line 62, such as a fibre channel cable, so that the secondary master storage apparatus 53 and the secondary slave storage apparatus 54 can transmit and receive data to/from each other via the signal line 62. The secondary master storage apparatus 53 can virtualize a storage area provided by the secondary slave storage apparatus 54.

Also, in the storage system 50, the primary master storage apparatus 51 is connected to the secondary master storage apparatus 53 and the primary slave storage apparatus 52 is connected to the secondary slave storage apparatus 54 via the respective signal lines 63 and 64 so that the primary master and slave storage apparatuses 51 and 52 can respectively transmit and receive data to/from the secondary master and slave storage apparatuses 53 and 54 via the signal lines 63 and 64.

When remote copy is executed in the storage system 50, data stored in a logical volume VOL1 in the primary master storage apparatus 51 is transmitted to the secondary master storage apparatus 53 via the signal line 63 in a synchronous or asynchronous mode to mirror the data in a logical volume VOL3 in the secondary master storage apparatus 53. Also, data stored in a logical volume VOL2 in the primary slave storage apparatus 52 is transmitted to the secondary slave storage apparatus 54 via the signal line 64 in a synchronous or asynchronous mode to mirror the data into a logical volume VOL4 in the secondary slave storage apparatus 54.

Also, in the storage system 50, management terminals 65 to 68 in the respective primary master and slave storage apparatuses 51 and 52, and the secondary master and slave storage apparatuses 53 and 54, are mutually connected via a network 67, such as a LAN, so that those management terminals 65 to 68 can transmit and receive relevant information to/from each other via the network 67.

When the primary slave storage apparatus 52 or the secondary master storage apparatus 53 is connected to the primary master storage apparatus 51 and the secondary slave storage apparatus 54 is connected to the secondary master storage apparatus 53 or the primary slave storage apparatus 52, the management terminal 65 in the primary master storage apparatus 51 collects licenses for various optional functions that the primary slave storage apparatus 52, the secondary master storage apparatus 53, or the secondary slave storage apparatus 54 has, by executing the above-described master side license succession processing sequence RT3 for the primary slave storage apparatus 54 and the secondary master and slave storage apparatuses 53 and 54, and updates the license management table 40 in its own storage apparatus accordingly.

When utilizing the above-described remote copy function, both the primary master storage apparatus 51 and the secondary master storage apparatus 53 each need a license for the remote copy therebetween; and both the primary slave storage apparatus 52 and the secondary slave storage apparatus 54 each need a license for the remote copy therebetween.

Therefore, when a new instruction to set the remote copy function (new setting or capacity expansion, and the like) is input by a user, each of the management terminals 66 to 68 in the primary slave storage apparatus 52, the secondary master storage apparatus 53, and the secondary slave storage apparatus 54 transmits, via the network 67 to the management terminal 65 in the primary master storage apparatus 51 in accordance with the optional function setting processing sequence RT5, described above referring to FIG. 12, a request to transfer the license (license transfer request) for the capacity specified by the user for the remote copy function.

Figure 13:
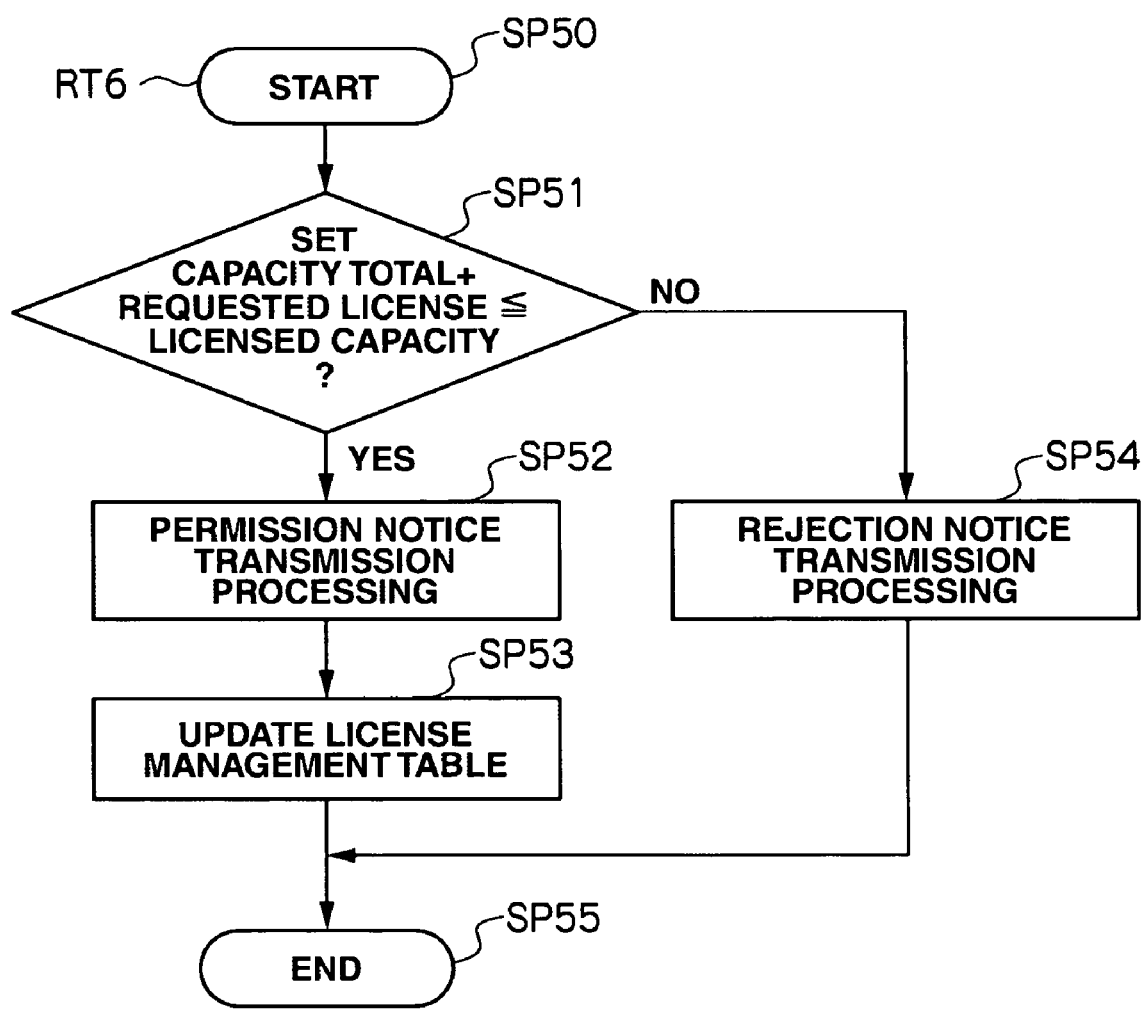
FIG. 13 is a flow chart illustrating operations in a master storage apparatus relating to optional function settings in a slave storage apparatus.

In response to the license transfer request from any of the management terminals 66 to 68 in the primary slave storage apparatus 52, the secondary master storage apparatus 53, or the secondary slave storage apparatus 54, the management terminal 65 in the primary master storage apparatus 51 transfers the license to the primary slave storage apparatus 52, the secondary master storage apparatus 53, or the secondary slave storage apparatus 54 in accordance with the above license transfer request reception processing sequence RT6 described referring to FIG. 13. The management terminals 66 to 68 in the primary slave storage apparatus 52, the secondary master storage apparatus 53, and the secondary slave storage apparatus 54 to which the license is transferred perform processing for setting the remote copy function in accordance with the license.

The storage system 50 having the above configurations has two methods for copying the data stored in the logical volume VOL2 in the primary slave storage apparatus 52 to the logical volume VOL4 in the secondary slave storage apparatus 54: a method transmitting the data from the primary slave storage apparatus 52 via the signal line 64 to the secondary slave storage apparatus 54; and a method transmitting the data from the primary slave storage apparatus 52, sequentially via the primary master storage apparatus 51 and the secondary master storage apparatus 53, to the secondary slave storage apparatus 54.

In the latter method, the storage area provided by the primary slave storage apparatus 52 is virtualized by the primary master storage apparatus 51 as a storage area provided by the primary master storage apparatus 51, and the storage area provided by the secondary slave storage apparatus 54 is virtualized by the secondary master storage apparatus 53 as a storage area provided by the secondary master storage apparatus 53. Accordingly, the license then becomes necessary for not only the remote copy between the primary slave storage apparatus 52 and the secondary slave storage apparatus 54 but also that between the primary master storage apparatus 51 and the secondary master storage apparatus 53, and so a double license charge is necessary for a remote copy of the same data.

Therefore, in the storage system 50, when the data stored in the logical volume VOL2 is remote copied between the primary slave storage apparatus 52 and the secondary slave storage apparatus 54 via the primary master storage apparatus 51 and the secondary master storage apparatus 53, the management terminals 65 and 67 in the primary master storage apparatus 51 and the secondary master storage apparatus 53 do not need to pay the license charge for that data. Accordingly, the user's economic burden can be further reduced.

(3) Another Embodiment

In the above-described embodiment, the present invention is applied to the storage system 1 in which only one slave storage apparatus 5 is connected to the master storage apparatus 4. However, the present invention is not limited to such as storage system and is applicable to a storage system in which a plurality of slave storage apparatuses 5 are connected to one master storage apparatus 4. In this case, the master storage apparatus 4 may transfer a license for any required capacity to the slave storage apparatuses 5 in response to a license transfer request from any of the slave storage apparatuses 5.

In the above-described embodiment, when the slave storage apparatus 5 is connected to the master storage apparatus 4, reception of the license management information transmission request transmitted from the master storage apparatus 4, that is, the approach by the master storage apparatus 4 is the trigger for the slave storage apparatus 5 to transmit the license for leftover capacity that its own storage apparatus has to the master storage apparatus 4. However, the present invention is not limited to such a case, and the storage system 1 can be configured so that when the slave storage apparatus 5 is connected to the master storage apparatus 4, the slave storage apparatus 5 transmits the license for leftover capacity to the master storage apparatus 4 at its own time without being approached by the master storage apparatus 4.

The present invention is applicable to a virtualization system in which a storage apparatus is connected to another storage apparatus and used as a virtual device.

I claim:

1. A storage system, comprising:
a first storage apparatus including a plurality of first storage devices and a first controller for providing, using the plurality of first storage devices, a plurality of first logical volumes to a host device;
a first management terminal that is connected to the first storage apparatus, including a first license management table for managing a first correspondence relationship between a first optional function and a first space licensed for the first optional function in the first storage apparatus and a second correspondence relationship between a second optional function and a second space licensed for the second optional function in the first storage apparatus, and the first management terminal for controlling, with reference to the first license management table, a first application of the first optional function to the plurality of first logical volumes in response to a request for setting the first optional function from a user and a second application of the second optional function to the plurality of first logical volumes in response to a request for setting the second optional function from the user;
a second storage apparatus including a plurality of second storage devices and a second controller for providing, using the plurality of second storage devices, a plurality of second logical volumes to the host device; and
a second management terminal that is connected to the second storage apparatus, including a second license management table for managing a third correspondence relationship between the first optional function and a third space licensed for the first optional function in the second storage apparatus and a fourth correspondence relationship between the third optional function and a fourth space licensed for the third optional function in the first storage apparatus, and the second management terminal for controlling, with reference to the second license management table, a third application of the first optional function to the plurality of second logical volumes in response to a request for setting the first optional function from the user and a fourth application of the third optional function to the plurality of second logical volumes in response to a request for setting the third optional function from the user,
wherein, detecting the second storage apparatus being connected to the first storage apparatus:
the first controller in the first storage apparatus maps the second logical volumes onto third logical volumes to the host device, the third logical volumes being located in the first storage apparatus as virtual volumes, and
the first management terminal calculates a fifth space by combining the first space of the first license management table and the third space of the second license management table received from the second management terminal and in response to a request for setting the first optional function, determines whether or not to set the first optional function as requested by the request according to a comparison between a space requested in the request for setting the first optional function and the fifth space.

2. The storage system according to claim 1, wherein upon the second storage apparatus being connected to the first storage apparatus, the first management terminal first executes predetermined connection processing for providing the second logical volumes such as predetermined mapping processing and processing for producing an address conversion table, the first management terminal transmits a license management information transmission request, or a request to transmit license management information about each optional function the second storage apparatus has a license for to the first storage apparatus to the second management terminal, the second management terminal sequentially transmits the license management information about each optional function the second storage apparatus has a license for to the first management terminal, when the first management terminal receives the license management information for an optional function from the second management terminal within a predetermined period of time, the first management terminal updates the license management table stored in the first storage apparatus, when the first storage apparatus has not received a license for a certain optional function but the second storage apparatus has a license for this optional function and is not using the optional function, the values in license management table in the first storage apparatus are updated, if the license management information from the second storage apparatus concerns an optional function that is not supported by the first storage apparatus, the license succession for that optional function from the second storage apparatus to the first storage apparatus is prohibited, and when the first management terminal receives an end notice from the second storage apparatus or becomes unable to receive the license management information within a predetermined period of time, the first management terminal ends the license succession processing.

3. The storage system according to claim 2, wherein upon the second management terminal receiving the license management information transmission request from the first storage apparatus, the second management terminal reads the license management information for a first optional function registered in the license management table, the second management terminal checks whether the second storage apparatus already has the license for that optional function based on the license management table, if the second storage apparatus does not have the license, then processing returns to reading the license management information for a first optional function registered in the license management table, if the second storage apparatus does have the license, then the second management terminal transmits the license management information for that optional function to the first management terminal, if part of the space licensed for that optional function is being used, the second management terminal transmits the license management information indicating leftover licensed space to the first storage apparatus, the second management terminal updates space of that optional function in the license management table to "0" when the function is not being used, or to the value of the space in use when part of the space licensed for the optional function is being used, the second management terminal then checks whether or not the license management table contains a subsequent optional function, if the license management table contains a subsequent optional function, the second management terminal executes processing on other optional functions registered in the license management table, sequentially switching the optional function to be the target of the processing, and when the second management terminal completes processing for all optional functions, the second management terminal transmits an end notice via the network to the first management terminal.

4. The storage system according to claim 1, wherein upon an instruction to set a new optional function being input by a user, the second management terminal refers to the license management table and checks whether the space set in the second storage apparatus is equivalent to or more than the total space required for the new optional function to be set according to the setting instruction, if the space set in the second storage apparatus is equivalent to or more than the total space required for the new optional function, then the second management terminal executes optional function setting processing, if the space set in the second storage apparatus is not equivalent to or more than the total space required for the new optional function, then the management terminal transmits a request to transfer the license for insufficient space for the optional function to the first management terminal, after transmitting the license transfer request, the second management terminal waits for a response from the first storage apparatus, when the second management terminal receives the response, the second management terminal checks whether the response is a rejection notice, if the response is a rejection request, the second management terminal displays an error report on a display in the second management terminal, if the response is not a rejection response, the second management terminal updates values in license management table.

5. The storage system according to claim 1, wherein when the first management terminal receives a license transfer request from the second management terminal, the first management terminal CPU checks whether a result of adding total space that has already been set in the first storage apparatus for the optional function the license transfer request is sent for from the second storage apparatus and the space for the optional function requested from the second storage apparatus is equivalent to or less than a value stored in the license management table in the first storage apparatus, if the result is yes, then the first management terminal transmits a permission notice to transfer the license for the space required for the corresponding optional function to the second management terminal, the first management terminal also updates the value in the license management table in the first storage apparatus to the value remaining after the space for the license transferred to second storage apparatus is subtracted, and if the result is no, the first management terminal transmits a rejection notice to the second management terminal.

6. The storage system according to claim 1, wherein if license management information from the second storage apparatus is about an optional function that is not supported by the first storage apparatus, then license succession for said optional function from the second storage apparatus to the first storage apparatus is banned.

7. A license management method for a storage system which includes a first storage apparatus including a plurality of first storage devices and a first controller for providing, using the plurality of first storage devices, a plurality of first logical volumes to a host device; a first management terminal that is connected to the first storage apparatus, including a first license management table, a second storage apparatus including a plurality of second storage devices and a second controller for providing, using the plurality of second storage devices, a plurality of second logical volumes to the host device, and a second management terminal that is connected to the second storage apparatus, including a second license management table, said license management method comprising:

managing, by said first management terminal using said first license management table, a first correspondence relationship between a first optional function and a first space licensed for the first optional function in the first storage apparatus and a second correspondence relationship between a second optional function and a second space licensed for the second optional function in the first storage apparatus;

controlling, by said first management terminal, with reference to the first license management table, a first application of the first optional function to the plurality of first logical volumes in response to a request for setting the first optional function from a user and a second application of the second optional function to the plurality of first logical volumes in response to a request for setting the second optional function from the user;

managing, by said second management terminal using said second license management table, a third correspondence relationship between the first optional function and a third space licensed for the first optional function in the second storage apparatus and a fourth correspondence relationship between the third optional function and a fourth space licensed for the third optional function in the first storage apparatus;

controlling, by said second management terminal, with reference to the second license management table, a third application of the first optional function to the plurality of second logical volumes in response to a request for setting the first optional function from the user and a fourth application of the third optional function to the plurality of second logical volumes in response to a request for setting the third optional function from the user, detecting the second storage apparatus being connected to the first storage apparatus:

mapping, by said first controller in said first storage apparatus, the second logical volumes onto third logical volumes, the third logical volumes being located in the first storage apparatus as virtual volumes, and calculating, by said first management terminal, a fifth space by combining the first space of the first license management table and the third space of the second license management table received from the second management terminal in response to a request for setting the first optional function and determining whether or not to set the first optional function as requested by the request according to a comparison between a space requested in the request for setting the first optional function and the fifth space.

8. The license management method according to claim 7, wherein upon the second storage apparatus being connected to the first storage apparatus, the first management terminal first executes predetermined connection processing for providing the second logical volumes such as predetermined mapping processing and processing for producing an address conversion table, the first management terminal transmits a license management information transmission request, or a request to transmit license management information about each optional function the second storage apparatus has a license for to the first storage apparatus to the second management terminal, the second management terminal sequentially transmits the license management information about each optional function the second storage apparatus has a license for to the first management terminal, when the first management terminal receives the license management information for an optional function from the second management terminal within a predetermined period of time, the first management terminal updates the license management table stored in the first storage apparatus, when the first storage apparatus has not received a license for a certain optional function but the second storage apparatus has a license for this optional function and is not using the optional function, the values in license management table in the first storage apparatus are updated, if the license management information from the second storage apparatus concerns an optional function that is not supported by the first storage apparatus, the license succession for that optional function from the second storage apparatus to the first storage apparatus is prohibited, and when the first management terminal receives an end notice from the second storage apparatus or becomes unable to receive the license management information within a predetermined period of time, the first management terminal ends the license succession processing.

9. The license management method according to claim 8, wherein upon the second management terminal receiving the license management information transmission request from the first storage apparatus, the second management terminal reads the license management information for a first optional function registered in the license management table, the second management terminal checks whether the second storage apparatus already has the license for that optional function based on the license management table, if the second storage apparatus does not have the license, then processing returns to reading the license management information for a first optional function registered in the license management table, if the second storage apparatus does have the license, then the second management terminal transmits the license management information for that optional function to the first management terminal, if part of the space licensed for that optional function is being used, the second management terminal transmits the license management information indicating leftover licensed space to the first storage apparatus, the second management terminal updates space of that optional function in the license management table to "0" when the function is not being used, or to the value of the space in use when part of the space licensed for the optional function is being used, the second management terminal then checks whether or not the license management table contains a subsequent optional function, if the license management table contains a subsequent optional function, the second management terminal executes processing on other optional functions registered in the license management table, sequentially switching the optional function to be the target of the processing, and when the second management terminal completes processing for all optional functions, the second management terminal transmits an end notice via the network to the first management terminal.

10. The license management method according to claim 7, wherein upon an instruction to set a new optional function being input by a user, the second management terminal refers to the license management table and checks whether the space set in the second storage apparatus is equivalent to or more than the total space required for the new optional function to be set according to the setting instruction, if the space set in the second storage apparatus is equivalent to or more than the total space required for the new optional function, then the second management terminal executes optional function setting processing, if the space set in the second storage apparatus is not equivalent to or more than the total space required for the new optional function, then the management terminal transmits a request to transfer the license for insufficient space for the optional function to the first management terminal, after transmitting the license transfer request, the second management terminal waits for a response from the first storage apparatus, when the second management terminal receives the response, the second management terminal checks whether the response is a rejection notice, if the response is a rejection request, the second management terminal displays an error report on a display in the second management terminal, if the response is not a rejection response, the second management terminal updates values in license management table.

11. The license management method according to claim 7, wherein when the first management terminal receives a license transfer request from the second management terminal, the first management terminal CPU checks whether a result of adding total space that has already been set in the first storage apparatus for the optional function the license transfer request is sent for from the second storage apparatus and the space for the optional function requested from the second storage apparatus is equivalent to or less than a value stored in the license management table in the first storage apparatus, if the result is yes, then the first management terminal transmits a permission notice to transfer the license for the space required for the corresponding optional function to the second management terminal, the first management terminal also updates the value in the license management table in the first storage apparatus to the value remaining after the space for the license transferred to second storage apparatus is subtracted, and if the result is no, the first management terminal transmits a rejection notice to the second management terminal.

12. The license management method according to claim 7, wherein if license management information from the second storage apparatus is about an optional function that is not supported by the first storage apparatus, then license succession for said optional function from the second storage apparatus to the first storage apparatus is banned.

* * * * *